C. O. ELLERT.
LIQUID FUEL TANK.
APPLICATION FILED SEPT. 2, 1911. RENEWED OCT. 10, 1918.

1,303,642. Patented May 13, 1919.

Witnesses:
J. Brooks
Patrick Cody

Inventor:
Charles O. Ellert

UNITED STATES PATENT OFFICE.

CHARLES O. ELLERT, OF BROOKLYN, NEW YORK.

LIQUID-FUEL TANK.

1,303,642.    Specification of Letters Patent.    Patented May 13, 1919.

Application filed September 2, 1911, Serial No. 647,461. Renewed October 10, 1918. Serial No. 257,669.

*To all whom it may concern:*

Be it known that I, CHAS. O. ELLERT, a citizen of the United States, residing in Brooklyn, county of Kings, State of New York, have invented a new and Improved Liquid-Fuel Tank, of which the following is a full, clear, and exact description.

This invention has reference to liquid fuel tanks designed more particularly for storage of a supply of gasolene or other suitable liquid fuel especially for use in connection with self propelled vehicles, and the object of the invention is to provide such a storage tank, which will hereinafter be termed a gasolene tank, wherein danger from explosions is minimized.

When from any cause ordinary gasolene tanks explode the rupture may take place at any part of the tank and the gasolene which usually at once begins to burn, is scattered about, often times to the injury of persons on or near the vehicle, and sometimes such explosions result in fatalities.

The present invention is not intended to prevent explosions but to cause the force of the explosion if it occurs to follow a predetermined path or direction whereby danger to the occupants of the vehicle or the persons near the vehicle and even to the vehicle itself is usually minimized. This desirable condition is brought about by providing the tank with a section which is readily rupturable as compared with the remainder of the walls of the tank, so that should there occur an explosion the readily rupturable portion will give way before the force of the explosion has reached a point where the tank might rupture at other parts than the one designed.

The main body of the tank is made of suitable material to withstand the wear and tear of ordinary use, while a section of the walls of the tank is made much thinner or more easily ruptured than the remainder of the tank, and this easily rupturable portion is usually directed toward the ground or toward some other point where the likelihood of danger due to an explosion is the least.

In many automobiles it is customary to provide an emergency supply of gasolene which may be drawn upon when the main supply is exhausted, such auxiliary supply being usually sufficient to carry the automobile to some point where a fresh supply may be obtained. With the present invention the tank may be provided with such auxiliary container for the gasolene by partitioning the tank into larger and smaller compartments, and the easily rupturable section is sufficiently extensive to form part of the walls of both compartments. The easily rupturable material is connected to the partition, thereby stiffening the easily rupturable section of the walls without materially affecting the capability of giving way under the force of an explosion before such force shall overcome the resistance of the remainder of the tank, wherefore the full force of the explosion is exerted in a predetermined direction thereby saving both the occupants of the vehicle and others in the near neighborhood from liability of injury.

The invention will be best understood from a consideration of the following detailed description, taken in connection with the accompanying drawings forming a part of this specification, with the understanding that while the drawings show a practical embodiment of the invention it is susceptible of other embodiments, wherefore the invention is not confined to any strict conformity with the showing of the drawings, but may be changed and modified so long as there is no material departure from the salient features of the invention.

In the drawings:—

Figure 1:
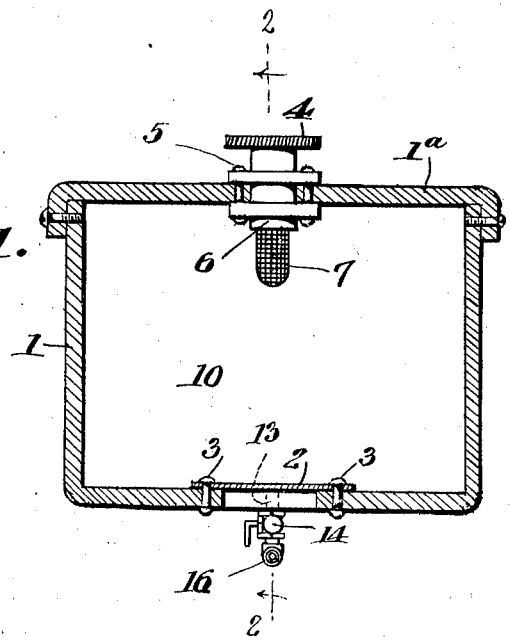
Figure 1 is a cross section of a liquid fuel tank with the invention applied.
Figure 2:
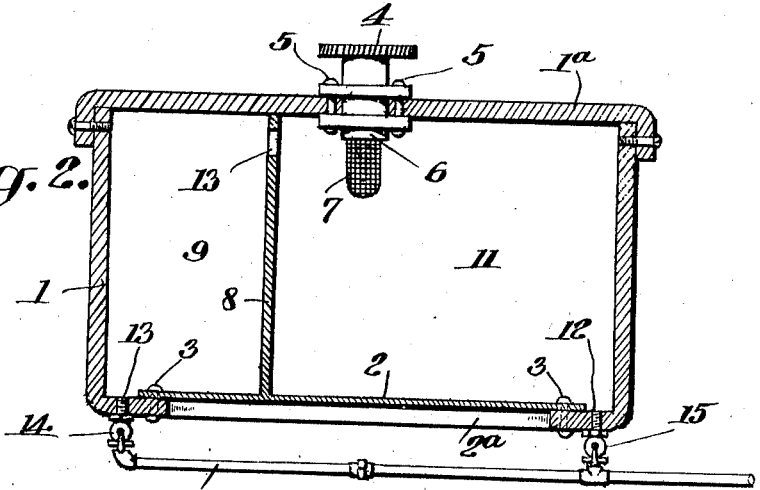
Fig. 2 is a section on the line 2—2 of Fig. 1.

In the drawings there is shown a tank 1 which may be made of any suitable material and suitably closed by a cover 1ª or like means and at an appropriate point there is formed through the walls of the tank a suitable passage or opening 2ª, to which is applied a suitable plate or like means 2, secured to the tank in any suitable manner, as by rivets 3, but such rivets are to be taken as indicative of any suitable fastening means whereby the plate 2, is connected to the walls of the tank 1, in covering relation to the said passage or opening 2ª, and in a manner to be tight to gasolene or any other suitable liquid fuel adapted for use in explosion engines, or which may be used in other connections, and which furthermore may under appropriate circumstances develop explosive conditions. It will be observed that the plate 2, is shown materially thinner than the walls of the tank 1, but the proportions indicated in the drawings are not to be considered as mandatory, since the proportions are somewhat exaggerated purposely to emphasize the characteristics of the invention. Any relation of the plate 2, and the walls of the tank 1, may be established, so long as the material of the plate 2, will yield readily to an explosive force as compared with the effect of the explosion upon the walls of the tank 1. Or the plate 2, may be made of the same or quite similar material to the body of the tank 1, and on making the plate 2, appropriately thinner than the walls of the main portion of the tank it will readily yield to a rupturing force and hence the force of an explosion will be relieved by the rupturing of the plate 2, before damage is done to the tank 1.

The tank 1, being of suitable construction may be provided with a suitable means through which the liquid fuel is adapted to pass into the said tank; 4 approximately indicating a suitable intake means having suitable threaded engagement with a suitable collar 6, or like means suitably secured by suitable rivets 5, to the tank 1, and if desired a suitable filtering means 7, for the liquid fuel may be provided.

In order to adapt the tank to carry not only a working supply of gasolene, but an emergency supply thereof, there is provided a partition 8, dividing the tank into two chambers 11, 9 communicating through a suitable passage 10 near what constitutes the upper end of the partition when the tank is in place upon an automobile or in any other operative position. The partition 8, is effectively a part of the plate 2, and since this partition is made secure to the inner walls of the main body of the tank 1, in order that it may be gasolene tight and must also be made secure to the plate 2, for the same reason, it constitutes a support for such plate, so that the latter may be quite thin, but is suspended sufficiently by the partition 8, to withstand the weight of the supply of gasolene or other liquid fuel, which weight might be sufficient in the absence of the partition 8, especially in large tanks, to bulge the plate 2, outwardly. The presence of the partition 8, however, does not sufficiently stiffen the plate 2, to prevent it from readily rupturing before the force developed by an explosion is sufficient to break down the walls of the main portion of the tank.

The two compartments 11 and 9 connect through respective valves 15 and 14 governing suitable outlets 12 and 13 to a pipe or conduit 16, which may lead to the engine or other point of utilization, the valves 14 and 15 making it possible to cut off the emergency compartment 9 until the compartment 11 has been exhausted.

When the tank is mounted on an automobile, the opening 2ª, may be so located as to be directed toward the ground and the tank may be so arranged with respect to the vehicle that there are no interfering structures between the said passage 2ª and the ground. The passage 2ª may be directly rearwardly with respect to the vehicle or rearwardly and downwardly. In case of stationary engines or of power boats the said opening or passage 2ª, may be arranged to face in any desired direction where the force of an explosion rupturing the plate 2, would be least destructive. Should an explosion occur the scattering of burning gasolene and the resultant damage is greatly minimized.

By extending the easily rupturable plate 2, to the emergency or reserve compartment either or both compartments are relieved from the excessive pressure of an explosion by the giving way of the easily rupturable plate 2 in one or both compartments.

By the present invention a material portion of the walls of the tank is made readily rupturable so that the force of the explosion will have an outlet commensurate with its violent character and the direction in which the force of the explosion is expended is therefore controllable despite its suddenness and violence.

When gasolene within the container explodes it does so in many instances with great force and suddenness and therefore a small blow out such as is ample in steam boilers and similar structures would be of small effect. The explosion of a steam boiler or the like is due to a relatively slow accumulation of pressure, which ultimately overcomes a weak spot and the boiler in most instances tears. Such slowly accumulating pressure may be relieved by the ordinary safety valve, but where such an expedient is not present a small blow-out member may be utilized having all the functions of a safety valve except the possibility of reclosing.

Explosions of gasolene due to the presence of an explosive mixture of gases in the tank are usually more violent than gun powder and the presence of a safety valve or blow out of small area would in many cases be wholly ineffective and the whole tank would be blown to pieces. By the present invention a material portion of the walls of the tank is made readily rupturable, so that the force of the explosion will have an outlet commensurate with its violent character and the direction in which the force of the explosion is expended is therefore controllable despite its suddenness and violence.

What I claim is:—

1. A tank or receptacle for storing fluids for power purposes provided with a wall construction adapted to engage with the forces of a violent combustion or explosion within the said tank in a manner to provide an exit for and guide or direct the violent expulsion of the products of said internal combustion or explosion to a predetermined point exterior to said tank, and provided with means within said tank for reinforcing said wall construction of said tank.

2. A tank or receptacle for liquid fuel, the vapors of which form an explosive mixture with air, having an internal partition dividing the tank into main and emergency compartments and also having a predetermined portion of its walls readily rupturable as compared with the remainder of the walls and extending to both sides of the partition and the latter being connected to the readily rupturable portion to form a sustaining means therefor against the weight of the liquid fuel in the tank, the area of the rupturable portion being to an extent to suddenly relieve the interior of the tank from the force of an explosion of the explosive mixture therein without damage to the rest of the walls.

In witness whereof I have hereunto signed my name in the presence of two subscribing witnesses.

CHARLES O. ELLERT.

Witnesses:
S. J. BROOKS,
PATRICK CODY.